June 10, 1952 W. A. RAY 2,599,862
WATERING SYSTEM
Filed Aug. 3, 1946
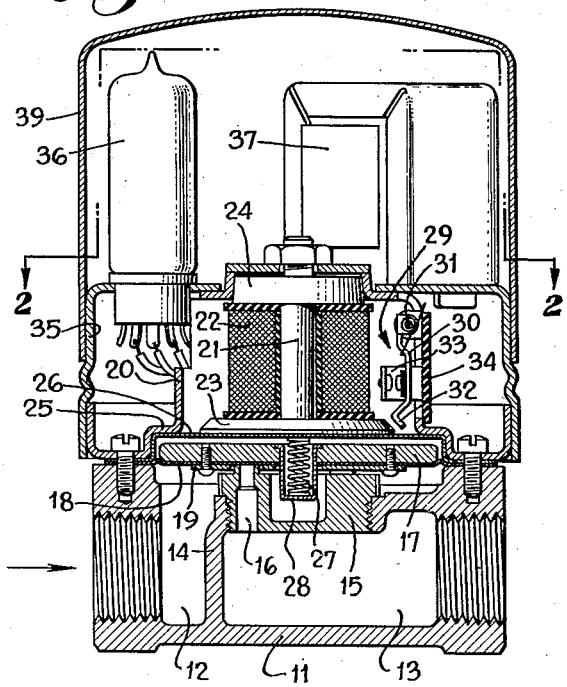
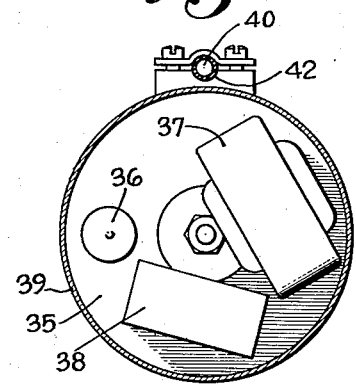
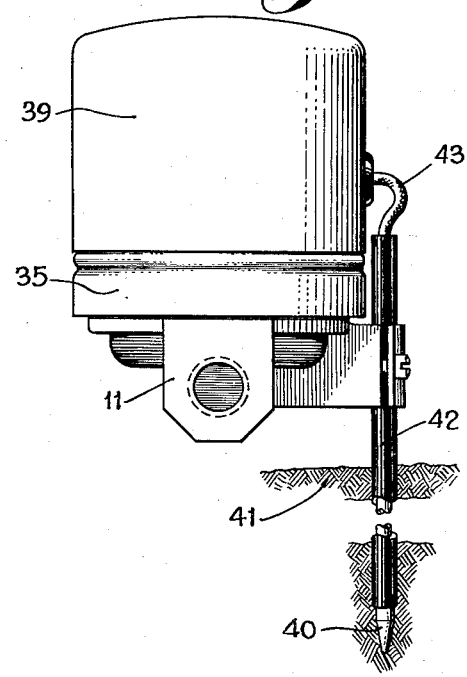
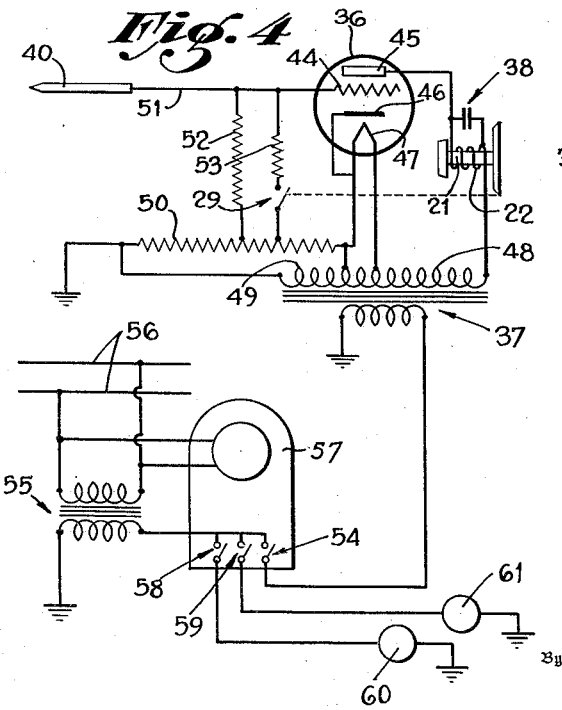
Inventor:
WILLIAM A. RAY,
John H. Rouse,
Attorney.

Patented June 10, 1952

2,599,862

UNITED STATES PATENT OFFICE 2,599,862

WATERING SYSTEM

William A. Ray, North Hollywood, Calif., assignor to General Controls Co., Glendale, Calif., a corporation of California Application August 3, 1946, Serial No. 688,379

7 Claims. (Cl. 299—25)

My present invention relates to an improved system for automatically controlling the watering or sprinkling of lawns or gardens. It has been proposed to accomplish this general purpose by providing an electrically-operated valve in the water-supply system and a clock-controlled timer switch whereby the valve is energized at regular intervals, such as once a day or on alternate days. In such a system the watering takes place even if the ground is wet due to rain or other causes. To correct this defect it is an object of the invention to provide an automatic watering system which includes means, responsive to the humidity of the ground, for preventing opening of the valve in the event the ground already has the desired degree of dampness.

Another object is to provide a watering system of the character described in the preceding object and which includes means for maintaining the valve in open condition for the full period after watering is initiated regardless of the resultant dampening of the ground.

Another object is to provide an electromagnetically-operated valve and switching device particularly adapted for use in a watering system of this character.

For full understanding of the invention, and further appreciation of its features and advantages, reference is to be had to the following detailed description and accompanying drawing, and to the appended claims.

In the drawing:

Figure 1 is a sectional view of an electromagnetic valve and switch structure adapted for use in the system of this invention;

Figure 2 is a transverse section, to reduced scale, taken along the line 2—2 of Fig. 1;

Figure 3 is a side elevation, to reduced scale, of the structure shown in Figs. 1 and 2; and Figure 4 is a diagram of a system embodying the invention.

Referring first to Figs. 1–3 of the drawing, the numeral 11 indicates a valve casing having an inlet 12 and an outlet 13 separated by an angled partition 14. Threaded in an opening through the horizontal part of this partition is a member 15 having three uniformly-spaced ports 16 therethrough; the material of the member being raised around the upper end of each of the ports to provide a narrow valve-seat. Cooperable with these seats is a disk-shaped closure 17 which is faced on its underside by a thin diaphragm 18 of flexible material such as rubber or leather. This diaphragm is attached to the closure by a plate 19 having openings extending around each of the valve seats, and is clamped at its margin between the edge of the open top end of the valve casing and the flange of a cupped member 20 secured to the casing; the diaphragm also serving as a guide for the closure, and as a seal which prevents the fluid in the casing from entering the area above the closure.

The cupped member 20 is of magnetic material and forms the outer core or shell of an electromagnet comprising, in addition, a central core 21 around which is a coil winding 22; the core 21 having at its lower end a circular polar-enlargement 23 and at its upper end a tapered enlargement 24 tightly fitting a corresponding opening in the outer core to facilitate conduction of magnetic flux. The outer core 20 is formed near its mouth to provide a shoulder 25 whose bottom surface is in the plane of the bottom surface of the polar-enlargement 23; these surfaces constituting the pole-faces of the electromagnet toward which the closure 17, being of magnetic material, is attractable; direct engagement of the armature-closure 17 with the pole-faces being prevented by a thin diaphragm 26 of non-magnetic material such as copper, which also serves to prevent leakage from the valve casing in the event of rupture of the flexible diaphragm 18. Biasing the closure 17 away from the electromagnet is a compression spring 27 which is contained in a cup 28 secured in an opening through the closure; the adjacent portion of the port-member 15 being recessed to accommodate this cup.

Mounted in an opening through the side wall of the outer core 20 is a switch 29 operable by the electromagnet. This switch comprises an arm 30 which is pivotally mounted on an iron pin 31, secured to the core, and is biased in a counter-clockwise direction. The arm is of magnetic material and its free end portion 32 is located adjacent the beveled periphery of the polar-enlargement 23 so that the arm constitutes an auxiliary armature attractable by the electromagnet. Cooperable with a contact insulatingly carried by the arm 30 is a contact bracket 33 mounted on a strip of insulating material 34 attached to the outer core.

Fitting over the turned-up extremity of the flange of the outer core 20 is a cupped bracket 35 (preferably of magnetic material, so that it aids conduction of return flux) which serves to support means for controlling the energization of the electromagnet comprising a vacuum-tube or electric-discharge device 36, a transformer 37, and a condenser 38; the circuit arrangement of these parts being shown in the diagram of Fig. 4. Fitting over the bracket 35 is a cover 39. As is seen in Fig. 3, there is mounted by a bracket on the back of the valve casing an electrode or probe 40 for insertion in the earth 41. The major portion of this probe is closely surrounded by an insulating sleeve 42 so that the probe is in electrical contact with the earth only at a point some distance below the surface where it is desirable to determine the humidity. The probe is connected by a wire 43 to the electrical apparatus associated with the valve in a manner to be described in connection with the electrical circuit of Fig. 4.

As is shown in Fig. 4, the electric-discharge device or tube 36 comprises a control electrode or grid 44, an anode 45, and a cathode 46 heated by a filament 47. The anode is connected to one end of the electromagnet coil-winding 22 which is shunted by the smoothing condenser 38. The other end of coil 22 is connected to one end of the secondary 48 of transformer 37, this secondary being grounded at its other end and tapped at intermediate points for the filament 47 so that there is a low-voltage section 49 toward the grounded end of the secondary for supplying a controlling bias to the grid 44. Shunted across the bias section 49 is a potential-divider or resistor 50. Connected between a grid-lead 51 and points on resistor 50 is a pair of resistors 52 and 53, the connection of the latter being controlled by the electromagnetic switch 29. The resistors 50, 52 and 53 are not shown in the other figures but may be mounted adjacent the other components of the circuit. Also connected to grid-lead 51 is the ground-probe 40.

One terminal of the primary of transformer 37 is grounded and the other is connected through a switch 54 to the secondary of an isolating transformer 55 whose primary is connected to the A. C. service lines 56. Operated by current from the service lines is a timer clock 57 whose function is to close the switch 54 and thereby effect energization of the control circuit at predetermined intervals of set duration, such as for one hour at a certain time each day. Other timer switches 58 and 59 may be provided for energization of additional valves indicated at 60 and 61; the arrangement preferably being such that the individual valves are energized in sequence, rather than simultaneously, if the supply of water is limited.

When the control circuit shown in the upper part of Fig. 4 is energized by the closing of the timer switch 54, if the ground is then relatively dry so that the grid-bias circuit through the probe 40 is substantially open, the tube 36 will be conductive during that part of the A. C. cycle when the anode is positive with respect to the cathode since the grid is then at a low negative value due to its connection to the potential-divider 50 through resistor 52. The resultant passage through coil 22 of pulses of rectified current (smoothed by the condenser 38) effects attraction of the armature-closure 17 and opening of the valve.

Simultaneously with the opening of the valve, the auxiliary armature constituted by the switch-arm 30 is attracted so that the switch 29 is closed, causing the grid bias to become still less negative (so that the tube continues to conduct) due to the connection of the grid through resistor 53 to a lower point on the potential-divider: the resistor 53 having a value considerably smaller than that of resistor 52. When, due to the watering of the ground, a grid circuit is formed through the wet ground and the probe there is a tendency for the grid to become highly negative since the potential-divider is grounded at its end which is most negative during the part of the A. C. cycle in which the tube can conduct. However, such tendency is overridden by the grid bias effected through resistor 53 whose resistance value, as previously mentioned, is of a low order, so that current continues to pass through the electromagnet and the valve remains open until the control circuit is deenergized by automatic operation of the timer switch.

In the event that when the control circuit is energized the ground is relatively damp, due to the circuit formed by the ground (whose resistance is then low with respect to that of resistor 52) the grid bias is sufficiently negative that the tube cannot pass enough current for operation of the valve and the same therefore remains closed during the normal watering period.

The embodiment of my invention herein shown and described is obviously susceptible of modification without departing from the spirit of the invention, and I intend therefore to be limited only by the scope of the appended claims.

I claim as my invention:

1. In a system for watering ground: a valve for controlling supply of water to said ground, electrical means for operating said valve, timer means for periodically supplying energy to said electrical means so as normally to effect opening of the valve, and means responsive to the humidity of the ground for so influencing said electrical means that the same is ineffective to initiate opening of the valve in the event that the ground is damp.

2. A watering system, as defined in claim 1, and wherein said electrical means includes an electric discharge device having a control electrode, and said humidity-responsive means comprises means forming with said damp ground a circuit for so biasing said control electrode that the discharge device is rendered nonconducting.

3. In a system for watering ground: a valve for controlling supply of water to said ground, electrical means for operating said valve, timer means for periodically supplying energy to said electrical means so as normally to effect opening of the valve, said electrical means including means responsive to the humidity of the ground for preventing opening of the valve in the event that the ground is damp, and means responsive to the energization of said electrical means for rendering said humidity responsive means ineffective so that the dampness of the ground due to the watering does not effect closure of the valve.

4. A watering system, as defined in claim 3, and wherein said means for rendering the humidity responsive means ineffective comprises a switch operated by said electrical means when the valve is opened.

5. In a system for watering ground: an electrically operated valve for controlling supply of water to said ground; means, comprising an electric discharge device having a control electrode, for supplying energy to said valve to open the same; means responsive to the humidity of the ground and forming with the ground, when the same is damp, an electric circuit for so biasing said control electrode that the discharge device is rendered nonconducting and hence incapable of supplying energy to open the valve; and means, including switching means operated by the energy supplied to open the valve when the ground is dry, for overriding said humidity-responsive biasing means so that subsequent dampness of the ground due to the watering does not effect closure of the valve.

6. In a system for watering ground: a valve for controlling supply of water to said ground; an electromagnet for operating said valve; electrical means for supplying energy to said electromagnet to effect opening of the valve, and comprising an electric discharge device having a control electrode; means responsive to the humidity of the ground and forming with the ground, when the same is damp, an electric circuit for so biasing said control electrode that the discharge device is rendered nonconducting and hence incapable of supplying energy to open the valve; and means, including a magnetic switch influenced by the flux produced in said electromagnet by the energy supplied thereto when the ground is dry, for overriding said humidity-responsive biasing means so that subsequent dampness of the ground due to the watering does not effect closure of the valve.

7. In a system for watering ground: a valve for controlling supply of water to said ground; an electromagnetic device for operating said valve and comprising a main armature forming a closure for the valve; electrical means for supplying energy to said electromagnetic device to effect opening of said valve-closure, and comprising an electric discharge device having a control electrode; means responsive to the humidity of the ground and forming with the ground, when the same is damp, an electric circuit for so biasing said control electrode that the discharge device is rendered nonconducting and hence incapable of supplying energy to open the valve; an auxiliary armature operated by said electromagnetic device when, while the ground is dry, energy is supplied thereto; and means, including switching means actuated by the operation of said auxiliary armature, for overriding said humidity-responsive biasing means so that dampness of the ground due to the watering does not effect closure of the valve.

WILLIAM A. RAY.

REFERENCES CITED

The following references are of record in the file of this patent:

UNITED STATES PATENTS

| Number | Name | Date |
|---|---|---|
| Re. 20,210 | Knowles | Dec. 22, 1936 |
| 1,018,251 | McKee | Feb. 20, 1912 |
| 1,373,376 | Zipoy | Mar. 29, 1921 |
| 1,985,216 | Shivers | Dec. 18, 1934 |
| 2,031,146 | Dodge | Feb. 18, 1936 |
| 2,064,651 | Fiene | Dec. 15, 1936 |
| 2,202,197 | Ewertz | May 28, 1940 |
| 2,284,158 | Lewis | May 26, 1942 |
| 2,318,969 | Reynolds | May 11, 1943 |
| 2,358,433 | Wolfner | Sept. 19, 1944 |
| 2,439,680 | Volz | Apr. 13, 1948 |
| 2,468,972 | Hagerty | May 3, 1949 |

FOREIGN PATENTS

| Number | Country | Date |
|---|---|---|
| 615,754 | Germany | July 11, 1935 |